United States Patent [19]

Kamiyama et al.

[11] 4,176,524
[45] Dec. 4, 1979

[54] FROST DETECTOR

[75] Inventors: Toshibumi Kamiyama, Neyagawa; Kunito Miyamoto, Hirakata, both of Japan

[73] Assignee: Matsushita Electric Industrial Co., Ltd., Kadoma, Japan

[21] Appl. No.: 847,814

[22] Filed: Nov. 2, 1977

[30] Foreign Application Priority Data

| Nov. 10, 1976 | [JP] | Japan | 51/136081 |
| Nov. 10, 1976 | [JP] | Japan | 51/151933[U] |
| Nov. 10, 1976 | [JP] | Japan | 51/151934[U] |
| Nov. 10, 1976 | [JP] | Japan | 51/151935[U] |
| Dec. 10, 1976 | [JP] | Japan | 51/166451[U] |

[51] Int. Cl.$^2$ ............... G08B 21/00; F25D 21/02
[52] U.S. Cl. ........................... 62/140; 310/324; 310/328; 340/582
[58] Field of Search ......... 62/140; 73/170 R, DIG. 4; 310/324, 328; 340/582

[56] References Cited

U.S. PATENT DOCUMENTS

| 3,240,054 | 3/1966 | Roth | 62/140 |
| 3,270,330 | 8/1966 | Weinberg | 310/328 X |
| 4,019,072 | 4/1977 | Mifune et al. | 310/8.1 |

FOREIGN PATENT DOCUMENTS 51-60584  5/1976  Japan .................................... 62/140

Primary Examiner—William E. Wayner
Attorney, Agent, or Firm—Cushman, Darby & Cushman

[57] ABSTRACT

A frost detector comprises a piezoelectric element secured on a metal diaphragm and inside an air-tight space formed by the diaphragm, a base and a bellows which air-tightly and resiliently connects the diaphragm and the base, the base being secured on a fin of a heat exchanger, the piezoelectric element being connected to an oscillation circuit and an oscillation detection circuit; resonance frequency and impedance characteristic of the piezoelectric element being changed by frosting on the outside face of the diaphragm, and the frosting being detected through a change or stopping of the oscillation and resultant output signal by the oscillation detection circuit.

9 Claims, 14 Drawing Figures

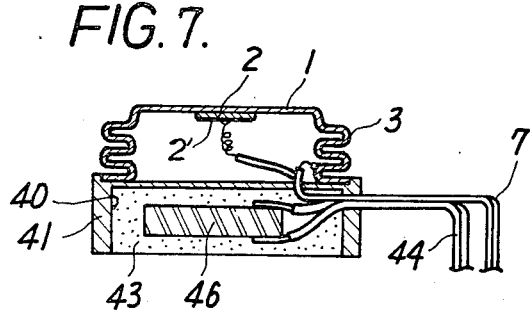
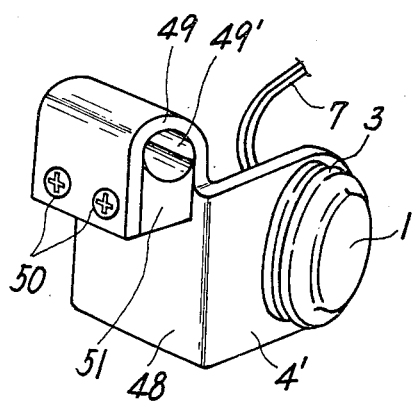
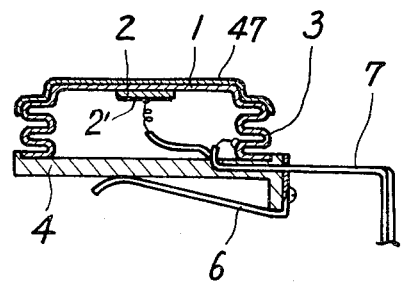
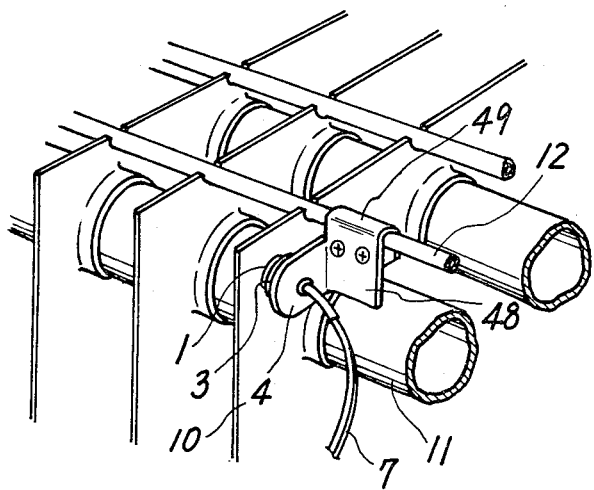
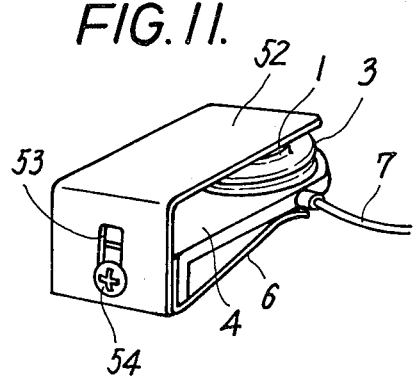

FROST DETECTOR

BACKGROUND OF THE INVENTION

1. Field of the Invention

This invention relates to a device for detecting frosting for use, for example, in a refrigerator or a freezer.

2. Background of the Invention

In general, frosting occurs on the surface of the cooling fins or the like heat exchanger means of a refrigerator or a freezer. Such frosting on the cooling fins decreases cooling efficiency of the apparatus, and therefore timely defrosting is necessary for such apparatus. Theoretically speaking, the defrosting should preferably be made at a detection of the frost. In the prior art, such frost detection has been made by means of temperature difference between two point of the heat exchanger or by means of optical detection. The former method to detect the temperature difference has a shortcoming of producing erroneous signal under some ambient conditions especially under the influence of moisture, and the latter method utilizing optical method has a shortcoming that contamination of the optical system produces erroneous result. Another way of detecting a change of electrostatic capacitance or electric conductivity at frosting has been proposed, but errors caused by water produced by melted frost has not been avoided.

Accordingly, in the conventional refrigerators or freezer, in place of the actual detection of the frost on the heat exchanger, timer switches have been used to actuate defrosting system, such as defrosting heater or switching the circuit of cooling media to perform a defrosting. However, such timer-controlled system does not actually detect the frost. Therefore, when ambient moisture is extremely high, even in the timer-controlled period of defrosting interval, a considerable amount of frost grows on the heat exchanger hence decreasing cooling effect by the frost, or when the ambient moisture is considerably low, an unnecesssary defrosting is made when no frost grows on the heat exchanger thereby unnecessary raising the chamber temperature of the refrigerator or the freezer.

SUMMARY OF THE INVENTION

The present invention purports to provide a frost detector for use in a refrigerator or freezer which is capable of detecting the frosting through a change of characteristics of a piezoelectric element when the frost grows.

BRIEF EXPLANATION OF DRAWING

FIG. 7 is a sectional side view of a frost detector of another embodiment.

FIG. 8 is a sectional side view of a frost detector of another embodiment.

FIG. 9 is a perspective view of a frost detector of another embodiment.

FIG. 10 is a perspective view of installation of the frost detector of FIG. 9 in a heat exchanger.

FIG. 11 is a perspective view of a frost detector of another embodiment.

DETAILED DESCRIPTION OF THE PREFERRED EMBODIMENTS

Figure 1:
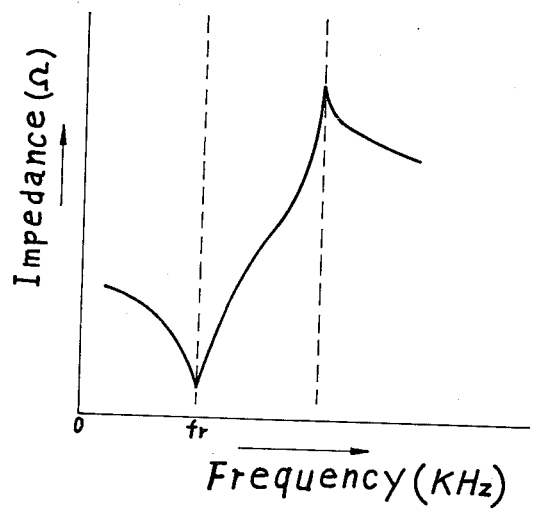
FIG. 1 is a chart showing frequency-impedance chactertistic of an electro-mechanical vibrator, for example, quarts or other piezoelectric vibrator.

As shown in FIG. 1, an electro-mechanical vibrator, for example, quartz or other piezoelectric vibrator has the frequency-impedance characteristic as shown in FIG. 1. Namely, the impedance of the piezoelectric device shows a sharp change around a resonance frequency fr. Therefore, when some physical effect, for example change of mass of the vibrating system causes to change the resonance frequency of the vibrator, then the impedance of the device sharply changes. The present invention utilizes such sharp change of the impedance.

Figure 2:
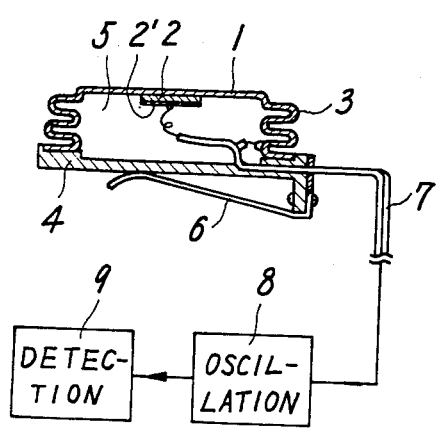
FIG. 2 is a sectional side view of a frost detector embodying the present invention.
Figure 3:
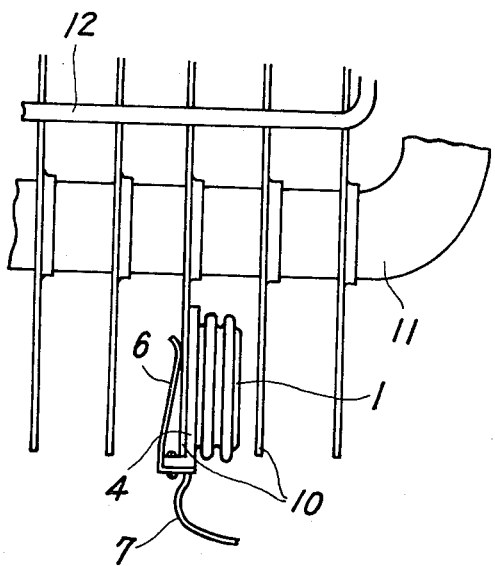
FIG. 3 is a side view showing the installation of the frost detector of FIG. 2 in a heat exchanger of a refrigerator.

FIG. 2 shows sectional side view of an example of the device, wherein a piezoelectric element 2 is fixed on a metal diaphragm 1. The metal diaphragm 1 serves as a diaphragm to be vibrated by the piezoelectric element 2, as a frost sensing plate on which frost grows and as an electrode to feed a current to the piezoelectric element 2. Therefore, the diaphragm is preferably hard and of a good conductor for heat and electricity. Phosphor bronz or beryllium bronz is suitable for the diaphragm. A bellows 3 resiliently connects the diaphragm 1 on a base 4, forming a air-tightly closed space therein. The bellows 3 is preferably of the same material with that of the diaphragm 1, and the base 4 should be a good heat conductor in order to conduct heat from a cooling fin to the bellows 3 and to the diaphragm 1. The air-tight space formed by the diaphragm 1, the bellows 3 and the base 4 air-tightly seals the piezoelectric element 2 therein. The bottom face of the base 4 comprises a clip 6 for clipping the assembled frost detector on a cooling fin. One end of a pair of lead-in insulated wires 7 are connected to an electrode 2' and the inside wall of the bellows.

The other ends of the lead-in wires 7 are connected to the output terminals of an oscillation circuit 8. A detection circuit 9 which detects a change of oscillation responding with the impedance of the piezoelectric element 2 is connected to the oscillation circuit 8.

The frost detector of FIG. 2 is installed by the clip 6 on a cooling fin 10 of a heat exchanger of a refrigerator or a freezer, wherein the fins 10, 10 are mounted on a pipe 11 of cooling media. A defrosting heater 12 is provided on the cooling fins 10, 10.

When a compressor motor is actuated and the cooling media flows in the pipe 11 thereby cooling the cooling fins 10,10 ... then, frost grows on the cooling fins 10, 10 .... At the same time, the cold temperature is conducted from the fin 10 to the base 4 and through the bellows 3 to the diaphragm 1. Accordingly, frost grows also on the surface of the diaphragm 1. As the frost on the diaphragm grows, an effective mass of the vibration system increases, and therefore, the resonance frequency fr is slightly changed. Since the gradient of frequency vs. impedance curve in the frequency range near the resonant frequency is very steep, the impedance greatly increases as a result of the frosting. When the rost further grows, the gap between the diaphragm 1 and the face of the fin 10 opposing thereto is filled with the frost, thereby giving a mechanical resistance and hence a damping against the vibration of the diaphragm 1. The abovementioned great change of the impedance and/or the forming of the damping hampers the oscillation of the circuit 8, thereby causing a detection circuit 9 to produce an output signal.

Figure 4:
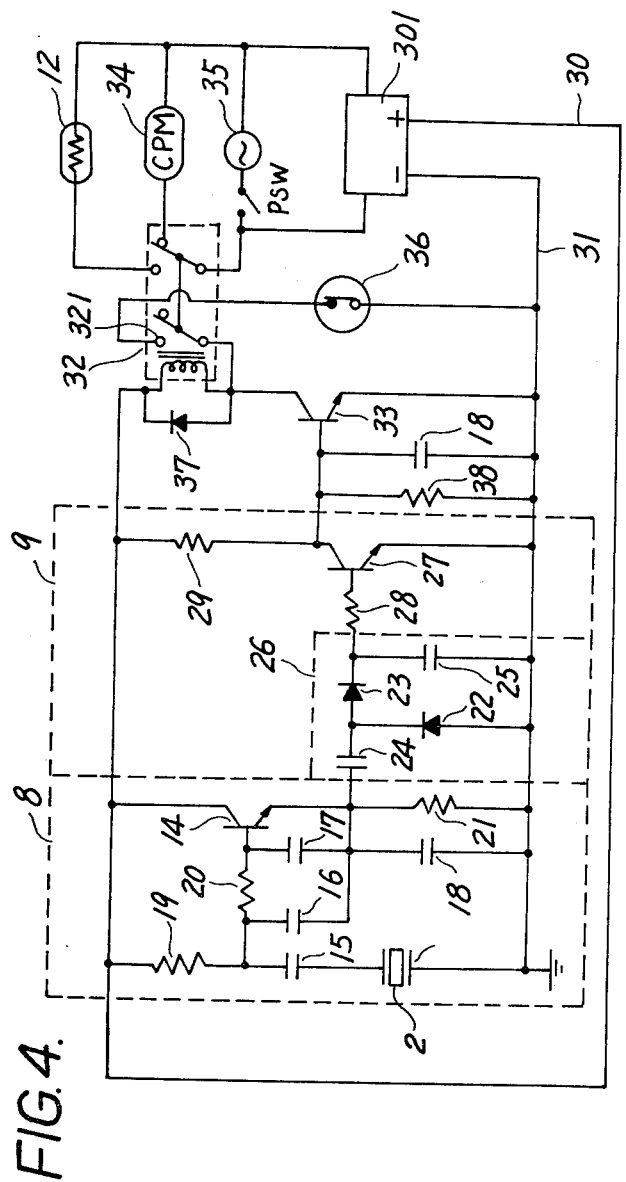
FIG. 4 is an example of circuit diagram for use with a frost detector of the present invention.

FIG. 4 is a circuit diagram of an example of actual circuit construction including the piezoelectric element 2, the oscillation circuit 8 and the detection circuit 9. The oscillation circuit 8 is a known Sabaroff circuit including the piezoelectric element 2 as the vibrator and a transistor 14 as the oscillating transistor, to which known circuit is added a resistor 19 for adjusting bias, the capacitor 15 for interrupting the DC voltage from source 301, and the capacitor 17 for adjusting oscillation. The detection circuit comprises a voltage doubler rectifier circuit 26 consisting of two diodes 22 and 23 and capacitors 24 and 25 and resistors. The voltage doubler circuit 26 receives oscillation output of the Sabaroff circuit 8, doubles it, and impress it, through a resistor, to the base of the transistor 27. The collector of the transistor 27 is connected to the base of the output transistor 33, and a coil of the output relay 32 is connected in series to the collector of the output transistor 33. The relay has a self-retension contact 321 which is connected in series with a normal closed thermal switch 36, and the series connection of the retention contact 321 and the thermal switch 36 is connected across the collector and the emitter of the transistor 33. A diode 37 is for protecting the transistor 33 from a surge pulse produced by the relay coil. The relay 32 has a change-over contacts which, when the relay is energized, cuts off the compressor motor CPM from the power source 35 and connects the defrosting heater 12 to the power source 35. A DC power source 301 is connected so as to be fed from the AC power source 35 and the positive feed line 30 and the negative feed line 31 are connected to the positive terminal and the negative terminal of the DC power source 301, respectively.

When the piezoelectric element 2 is vibrating, the oscillation output is given to the voltage-doubler circuit 26, and hence the transistor 27 is conductive. As a result, the output transistor 33 is non-conductive thereby keeping the relay 32 deenergized as shown in FIG. 4. In this state, the compressor motor rotates and the defrosting heater 12 is OFF.

When the frost grows on the diaphragm to a specified thickness, the oscillation of the circuit 8 stops, and therefore the voltage-doubler circuit 26 stops to the output to the transistor 27. Therefore, the transistor 27 is made OFF and the output transistor 33 is made ON. Accordingly, the relay 32 is energized and retained so by the retention contact 321, then compressor motor 34 stops and the defrosting heater is energized. As the heat exchanger becomes hot by being heated by the defrosting heater 12, the thermal switch 36 attached on the heat exchanger becomes OFF and cuts off the retension current of the relay 32, thereby restoring the relay 32 and hence energizing the compression motor and deenergizing the heater 12. The capacitor 25 of the voltage-doubler circuit 26 functions to give a specified time constant in order to prevent undesirable start of defrosting at an accidental momentary power failure.

The frost detector of the present invention attains reliable detection of the frost itself irrespective of ambient atmosphere, since the frost is detected by its mass or thickness. Therefore, it is possible to operate the defrosting means exactly at a preset level of frosting, thereby eliminating waste operation of defrosting means during a period when no frost yet grows and also eliminating fear of insufficient defrosting under a wet ambient atmosphere that necessitates a very frequent defrosting. Thus, defrosting becomes efficient. Since the piezoelectric element is sealed in a air-tight space 5, the piezoelectric element is well protected from a moist and cold atmosphere. Since the diaphragm is supported by a resilient bellows, the vibration of the diaphragm and the piezoelectric element is not hampered, and detection accuracy is very high. Since the frost detector of the present invention has a simple construction, the device can be made small and compact, can be suitable for mass production and can be manufactured at a low price. Since the frost detector of the present invention is small in size, it is suitable to be secured on any part of fins of an evaporator.

Figure 5:
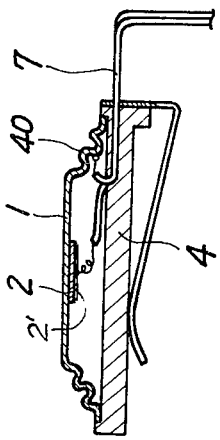
FIG. 5 is a sectional side view of a frost detector of another embodiment.

FIG. 5 shows another example, wherein a bellows 40 connecting the diaphragm 1 and the base 4 is shaped to have a larger diameter at the part contacting the base than at the top part contacting the diaphragm. By such configuration, the diaphragm 1 and the bellows 40 can be made easily by a single pressing with a metal sheet.

Figure 6:
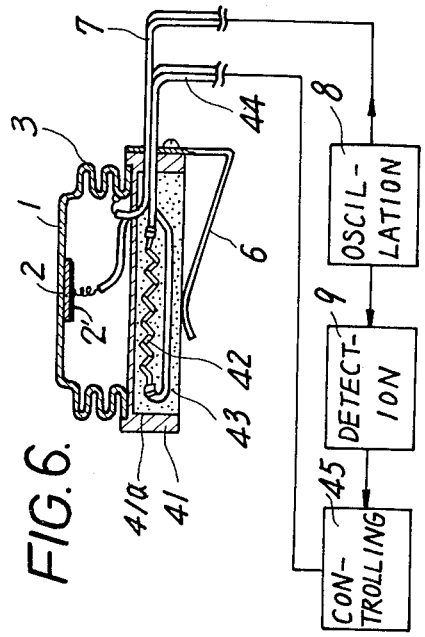
FIG. 6 is a sectional side view of a frost detector of another embodiment with relating circuit.

FIG. 6 shows another embodiment, wherein besides the construction of FIG. 2, the base 41 has a frost drying electric heater 42 buried with a resin mold 43 in a recess 41a formed underneath the base 41. This heater is electrified symultaneously with or after defrosting by the heater 12. Therefore, a small amount of the water drops produced by defrosting and remaining on the diaphragm 1 is certainly dried away. Therefore, there is no fear that such remaining water on the diaphragm is freezed and produces spurious detection signal. The detector of FIG. 6 is connected as shown in FIG. 6, by the lead wires 7 of the piezoelectric element to the oscillation circuit 8 and by the lead wires 44 of the heater 42 to the controlling circuit 45 which controlls to electrify the heater 42 for a specified time period after or symultaneously with the energization of the defrosting heater 12. By such heating with the heater 42, the frost detector becomes completely dried before the next starting of freezing or cooling, and therefore, no spurious signal due to remaining water is produced. When the diphragm 1 and the bellows 3 are made in one united body of the same metal, the heat conduction inbetween is good, the heat conduction from the base to the diaphragm is rapid and efficient. Suitable materials for the mold resin 43, are heat-resisting, good adhering resins, for example, a composite resin consisting mainly of epoxy resin, etc.

FIG. 7 shows another embodiment wherein the base 41 has a frost drying heater which is made by a thermister of positive characteristic. The positive characteristic thermister prominently increases its resistance above a specified temperature. Therefore, the temperature of the heater is automatically controlled at a constant temperature. Therefore, by suitably selecting the characteristic of the thermister, an overheating of the frost detector is prevented, thereby preventing undesirable deterioration of the piezoelectric element by unduly high temperature.

FIG. 8 shows another embodiment, wherein a water-repellent film 47, for example, consisting mainly of tetrahydrofuran resin is formed to cover the outer surface of the diaphragm 1 instead of providing the base 4 with a heater. In case a precision requirement of the frost detection is not extremely high, purging of the water produced by the defrosting can be substantially made by the water-repellent film coating 47. The repelled water drops on the water-repellent film 47 automatically gather and form large drops and slip off the diaphragm. Therefore, in the next freezing period, there is no fear that remaining water drops freeze on the diaphragm face.

FIG. 9 shows another embodiment, wherein the base does not have a built-in defrosting heater, but has an engaging bend 49 formed on an extended part 48 of a base 4' to which a bellows 3 is connected. A contacting block 51 is fixed by bolts 50 under the bend 49 thereby forming a cylindrical hole 49' defined by the bend 49 and the contacting block 51. Other parts of the device are similar to those of the example of FIG. 2. The device is fixed on a defrosting heater 12 by embracing the heater 12 in the cylindrical hole 49' in a manner that the diaphragm 1 is disposed to face a cooling fin 10 with a specified narrow gap inbetween. Therefore, when the defrosting heater 12 is heated for a defrosting, the heat is transmitted to the base 4' and further to the diaphragm 1. Therefore frost on the diaphragm is melted and further evaporated, thereby ensuring satisfactory next frost detection. The shapes of the extended part 48, the bend 49 and the contacting block 51 should be appropriately designed to correspond with the construction of the heat exchanger.

Figure 12:
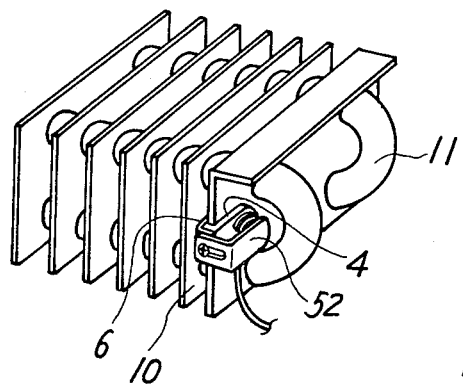
FIG. 12 is a perspective view of a frost detector of FIG. 11 in a heat exchanger.

FIG. 11 shows another example, wherein almost parts are similar to the examples of FIG. 2, FIG. 5, FIG. 6, FIG. 7 or FIG. 8, but comprises an L-shaped frost plate 52 which is disposed over the diaphragm 1 with an adjustable small gap inbetween. The gap between the diaphragm 1 and the opposing face of the frost plate 52 is adjustable by losing a screw 54, sliding the frost plate 52 taking advantage of engagement of an oblong hole 53 with the screw 54 and then tightening the screw 54. By increasing the gap the frost detection sensitivity is decreased, and by decreasing the gap the sensitivity is increased. FIG. 12 shows the way that the device of FIG. 11 is installed on a cooling fin 10 by means of the clip 6. When the cooling fin 10 is cooled, the base 4 contacting the fin 10 is cooled, and further, the frost plate 52, as well as the diaphragm 1 is also cooled. Therefore, frosts grow on the diaphragm 1 and on the frost plate 52. When the frosts grow beyond a level, frost on the diaphragm face and frost on the opposing face of the frost plate 52 contact each other, and gives a great change of mechanical resistance against the vibration of the piezoelectric element 2. Therefore the oscillation output of the oscillation circuit is stopped, thereby producing a detection signal. The example of FIGS. 11 and 12 has an advantage that if the gap is appropriately adjusted, then it is possible to install the device without considering the gap between the diaphragm surface and the fin surface.

Figure 13:
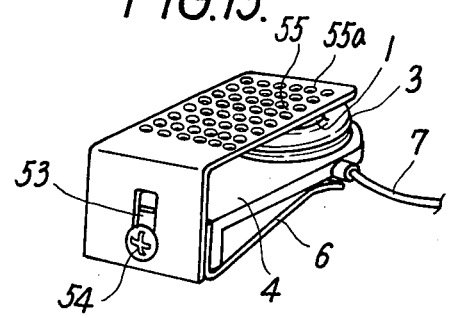
FIG. 13 is a perspective view of a frost detector of another embodiment.

FIG. 13 shows an improvement to the device of FIG. 11. In the improved device of FIG. 13, many perforations 55a are formed on the frost plate 55, in order that vibration of air by, and in front of, the diaphragm 1 is not impeded by the closely disposed frost plate 55.

Therefore, even when the gap is very narrowly set for a detection with high sensitivity, the resonance frequency of the device is not influenced by the narrowness of the gap and the Q value of the oscillation circuit can be held sufficiently high, thereby attaining a stable operation as the frost detector.

Figure 14:
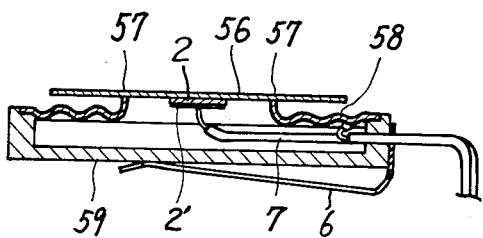
FIG. 14 is a sectional side view of a frost detector of another embodiment.

FIG. 14 shows another example wherein connection of the diaphragm 56 and the bellows 58 is improved in order to increase sensitivity of detection. Namely, the diaphragm 56 is held by the bellows 58 at a nodal circle 57 of vibration, the nodal circle being inside the peripheral edge by a specified distance. Therefore, the periphery of the diaphragm 56 is made a loop of the vibration. Since the frost has a nature of growing more at the peripheral edge of a disc than inside parts thereof, a thicker growing frost at the periphery makes sensitive detection of the frost.

As is elucidated referring to the preferred examples, the present invention has the following advantages.

(1) Since the devices of the present invention detect frost through detection of the impedance change of the piezoelectric element as the frost grows, an ideal defrostings system based on a direct detection of frost are attainable. The detection level/and or sensitivity is not influenced by ambient or operating conditions and, a precise and high sensitivity detection is made, thereby enabling most effective and economical runnings of the freezing systems.

Especially for frozen foods, valid storage periods thereof are shortened responding with number of times of defrosting operations, and accordingly the frost detection device of the present invention is especially useful in prolonging the valid storage period, because useless defrosting operation when no frost grows is dispensed with, since the defrosting signal is made only when the frost actually grows, unlike the conventional systems wherein defrosting signals are issued by a timer switch or a counter switch counting the number of door openings.

(2) Since the piezoelectric element is disposed in an air-tightly closed space formed by a diaphragm, a bellows and a base, a sufficient life and characteristics of the piezoelectric element are ensured.

(3) Since the diaphragm is supported by the bellows, the compliance of the vibration of diaphragm is assured, thereby enabling sensitive detection of frosting which hiterto has been difficult to sensitively detect.

(4) Since the frost detector of the present invention is formed in a rather compact unit with simple construction, manufacturing cost of it is made reasonable and easily is installed to the heat exchanger of a freezing or cooling apparatus.

What we claim is:

1. A frost detector comprising a piezoelectric element for connection as part of an oscillator circuit, a metal diaphragm to which said piezoelectric element is secured inside an air-tight space formed in part by the diaphragm, a base with a securing means and a resilient and heat conductive bellows connecting said diaphragm to said base and completing enclosure of the air-tight space, said diaphragm and said base being made of heat conducting material and said base including securing means for securing it in a heat-conductive manner to a cooling point.

2. A frost detector of claim 1 wherein said base having a diaphragm drying electric heater in a recess formed therein.

3. A frost detector of claim 2 wherein said electric heater consists of positive characteristic thermister.

4. A frost detector of claim 1 wherein outer surface of said diaphragm has a coating of water-repellent film.

5. A frost detector of claim 1 wherein said securing means is a heat conductive engaging means for engaging with a defrosting heater of a heat exchanger.

6. A frost detector of claim 1 which further comprises a frost plate of heat conductive material which is heat-conductively secured to said base in a manner that said frost plate faces to said diaphragm with a gap inbetween and said gap being adjustable.

7. A frost detector of claim 6 wherein said frost plate has perforations.

8. A frost detector of claim 1 wherein said bellows is connected to said diaphragm on a node circle which is inside by a specified distance from the peripheral edge of said diaphragm.

9. A frost detector of claim 1 wherein said base has a clip for mounting the base on a fin of a heat exchanger.

* * * * *